(12) United States Patent
Bare et al.

(10) Patent No.: US 9,865,087 B2
(45) Date of Patent: Jan. 9, 2018

(54) METHOD AND SYSTEM FOR DISAMBIGUATION OF AUGMENTED REALITY TRACKING DATABASES

(71) Applicant: Huntington Ingalls, Inc., Newport News, VA (US)

(72) Inventors: Brian Bare, Chesapeake, VA (US); Jonathan Martin, Virginia Beach, VA (US); Paul Sells, Newport News, VA (US); Patrick Ryan, Carrollton, VA (US)

(73) Assignee: Huntington Ingalls Incorporated, Newport News, VA (US)

(*) Notice: Subject to any disclaimer, the term of this patent is extended or adjusted under 35 U.S.C. 154(b) by 67 days.

(21) Appl. No.: 14/210,601

(22) Filed: Mar. 14, 2014

(65) Prior Publication Data

US 2014/0267417 A1    Sep. 18, 2014

Related U.S. Application Data

(60) Provisional application No. 61/787,780, filed on Mar. 15, 2013, provisional application No. 61/787,966, (Continued)

(51) Int. Cl.

| G06T 19/00 | (2011.01) |
|---|---|
| G06F 17/30 | (2006.01) |
| H04W 64/00 | (2009.01) |
| G02B 27/01 | (2006.01) |
| H04L 29/06 | (2006.01) |

(Continued)

(52) U.S. Cl.
CPC .......... *G06T 19/006* (2013.01); *G02B 27/017* (2013.01); *G06F 17/30241* (2013.01); *G06F 17/30321* (2013.01); *H04L 63/08* (2013.01); *H04L 67/38* (2013.01); *H04W 4/043* (2013.01); *H04W 12/06* (2013.01); *H04W 64/003* (2013.01); *H04L 63/0861* (2013.01)

(58) Field of Classification Search
CPC .................................................... G06T 19/006
USPC ......................................................... 345/633
See application file for complete search history.

(56) References Cited

U.S. PATENT DOCUMENTS

| 6,816,779 B2 * | 11/2004 | Chen ...................... G06T 17/05 340/445 |
| 7,884,712 B2 | 2/2011 | Nierenberg et al. |

(Continued)

FOREIGN PATENT DOCUMENTS

WO    WO 2013/028908    2/2013

OTHER PUBLICATIONS

PCT International Search Report for International Application No. PCT/US2014/027333, dated Aug. 11, 2014, 2 pages.

(Continued)

*Primary Examiner* — Devona Faulk
*Assistant Examiner* — Hai Tao Sun
(74) *Attorney, Agent, or Firm* — Hunton & Williams LLP (57) ABSTRACT

A method and system for reducing the amount of processing that an augmented reality platform needs to perform in order to provide an augmented reality experience to a user. The present invention enhances the efficiency of augmented reality processing by reducing the amount of tracking cues and images that need to be processed to determine the narrow pose of a mobile device that outputs the augmented reality experience.

9 Claims, 4 Drawing Sheets

Related U.S. Application Data filed on Mar. 15, 2013, provisional application No. 61/788,104, filed on Mar. 15, 2013.

(51) Int. Cl.
*H04W 4/04* (2009.01)
*H04W 12/06* (2009.01)

(56) References Cited

U.S. PATENT DOCUMENTS

| | | | |
|---|---|---|---|
| 8,212,859 B2 | 7/2012 | Tang et al. | |
| 8,248,467 B1 | 8/2012 | Ganick et al. | |
| 8,547,222 B2 | 10/2013 | Aninye et al. | |
| 8,738,754 B2 * | 5/2014 | Windell | H04L 43/0817 |
| | | | 345/632 |
| 8,780,342 B2 * | 7/2014 | DiBernardo | G01S 5/163 |
| | | | 356/139 |
| 2003/0179308 A1 * | 9/2003 | Zamorano | A61B 5/00 |
| | | | 348/333.12 |
| 2005/0232642 A1 | 10/2005 | Egner et al. | |
| 2008/0280676 A1 | 11/2008 | Distanik et al. | |
| 2010/0287485 A1 * | 11/2010 | Bertolami | G06F 3/011 |
| | | | 715/764 |
| 2011/0279453 A1 * | 11/2011 | Murphy | G06T 13/00 |
| | | | 345/420 |
| 2011/0310087 A1 * | 12/2011 | Wright, Jr. | G06T 13/80 |
| | | | 345/419 |
| 2012/0233025 A1 | 9/2012 | Calman et al. | |
| 2013/0116922 A1 * | 5/2013 | Cai | G01C 21/206 |
| | | | 701/515 |
| 2013/0169682 A1 * | 7/2013 | Novak | G02B 27/017 |
| | | | 345/633 |

OTHER PUBLICATIONS

Supplementary European Search Report, European Patent Application No. 14768944.2, dated Jul. 21, 2016, pp. 1-2.

\* cited by examiner

METHOD AND SYSTEM FOR DISAMBIGUATION OF AUGMENTED REALITY TRACKING DATABASES

CROSS-REFERENCE TO RELATED APPLICATIONS

This patent application claims priority to U.S. Provisional Application No. 61/787,966, filed Mar. 15, 2013, and titled "Disambiguation of Augmented Reality Tracking Databases," to U.S. Provisional Application No. 61/788,104, filed Mar. 15, 2013, titled, "Shipboard Augmented Reality Platform," and to U.S. Provisional Application No. 61/787,780, filed Mar. 15, 2013, titled "Secure Data Display Using Augmented Reality." This patent application is also related to U.S. Non-Provisional Application Ser. No. 14/210,650 entitled "System and Method for Determining and Maintaining Object Location and Status," filed on Mar. 14, 2014, and to U.S. Non-Provisional Application Ser. No. 14/210,730 entitled "System and Method for Providing Secure Data Display Using Augmented Reality," filed on Mar. 14, 2014. Each of the foregoing is incorporated by reference in its entirety.

FIELD OF THE INVENTION

The field of the present invention relates generally to disambiguation of tracking cues within augmented reality tracking databases.

BACKGROUND

Augmented reality (AR) provides a view of a physical, real-world environment whose elements are augmented (or supplemented) by computer-generated sensory input such as sound, text, graphics, or video. Augmented reality is useful in various applications including construction, repair, maintenance, education, navigation, design, military, medical, or entertainment, for example. One of the key components of augmented reality is the establishment of the position (x, y, z) and the orientation (θ, φ, ζ) of an object in a physical space—hereinafter referred to as an object's "pose." Typically the object whose pose is determined is a mobile device that itself provides the augmented view of reality. An accurate means of establishing pose uses vision-based algorithms. A mobile device may receive one or more images or signals from a physical space and these images or signals may be input to the vision-based algorithms for determining the pose of the mobile device. These algorithms recognize unique pre-identified visual tracking cues in the physical space by comparing the received images and/or signals from the physical space with stored tracking cues. The tracking cues may be known images or point clouds of the space, for example. For small physical spaces, this approach is effective, but as the number of tracking cues increases (such as in a large building with many rooms or open spaces), the computational time required to extract pose increases dramatically.

In conventional systems, pre-identified tracking cues are stored in a tracking cue database that does not delineate the tracking cues based on the physical location of the mobile device. When the system attempts to determine the pose of the mobile device, it receives one or more images or signals from the device and compares them to the tracking cues in the entire tracking cue database, regardless of the actual physical location of the device. This approach requires a substantial amount of computational resources, especially when dealing with large physical spaces with numerous tracking cues. The present invention addresses these problems.

SUMMARY OF THE INVENTION

Embodiments of the present invention provide a method and system for determining a narrow pose of a mobile device in a sub-space of a large space for the purpose of providing an augmented reality experience. This may be accomplished by receiving information about a unique characteristic of the sub-space of the large space, which information may be captured by the mobile device; comparing the captured information to known unique characteristics stored in a tracking cue database; determining, based on the comparing, a sub-space ID corresponding to the sub-space in which the mobile device is located; disambiguating tracking cues within the tracking cue database to identify a subset of tracking cues within the tracking cue database, which subset of tracking cues may correspond to tracking cues within the sub-space; inputting the subset of tracking cues to an augmented reality processor; receiving images of the sub-space, which images may be captured by the mobile device; inputting the images into the augmented reality processor; and determining, by the augmented reality processor, the narrow pose of the mobile device in the sub-space, using the inputted images and subset of tracking cues.

BRIEF DESCRIPTION OF THE DRAWINGS

In order to facilitate a fuller understanding of the exemplary embodiments, reference will be made to the appended drawings, in which like reference characters are used to indicate like elements. These drawings should not be construed as limiting, but are intended to be exemplary only.

DETAILED DESCRIPTION OF THE INVENTION

Reference will now be made in detail to exemplary embodiments, examples of which are illustrated in the accompanying drawings. The following description is intended to convey a thorough understanding of the embodiments described by providing a number of specific embodiments. It should be appreciated that the following detailed descriptions are exemplary and explanatory only and are not restrictive. As used herein, any term in the singular may be interpreted to be in the plural, and alternatively, any term in the plural may be interpreted to be in the singular.

The present disclosure includes several approaches for reducing the amount of computational time required to estimate the position (x, y, z) and orientation (θ, φ, ζ) of an object in a physical space, i.e., the object's pose. One efficient method of determining an object's pose is to use a tracking cue database that delineates tracking cues based on a determined small physical location of the mobile device.

The "small" physical location is small in the sense that its location corresponds to a subset of tracking cues from the entirety of the tracking cues in the tracking cue database. A large space, such as a building, ship, or a geographic region, for example, may be divided into one or more smaller sub-areas, such as sub-spaces or rooms. A sub-space may correspond to a room or a collection of rooms. Alternatively, individual rooms or areas of a large space may be divided into more than one sub-space. Each sub-space may have unique objects, which unique objects may be representative of unique tracking cues. Additionally, each sub-space may be associated with a "sub-space ID" that is unique to that sub-space. The tracking cue database may contain all of the tracking cues within the large space (e.g., building). The tracking cue database may be indexed by sub-space ID such that particular segments of the tracking cue database correspond to the known, particular tracking cues in the individual sub-spaces. Accordingly, it is advantageous to determine a sub-space ID, which corresponds to a particular sub-space in which the mobile device is currently located, so that only a subset of the tracking cue database need be referenced and/or processed when determining pose of mobile device 101.

Sub-space ID may be established using one or more of the following exemplary techniques:
  Optical/digital pulse recognition technology embedded in the sub-space's lighting;
  Unique 2-dimensional tracking images in each sub-space;
  Correlated 3-dimensional tracking features aligned with known 3-dimensional information in each sub-space; and/or
  Unique audio tones emanating from each sub-space.

Figure 1:
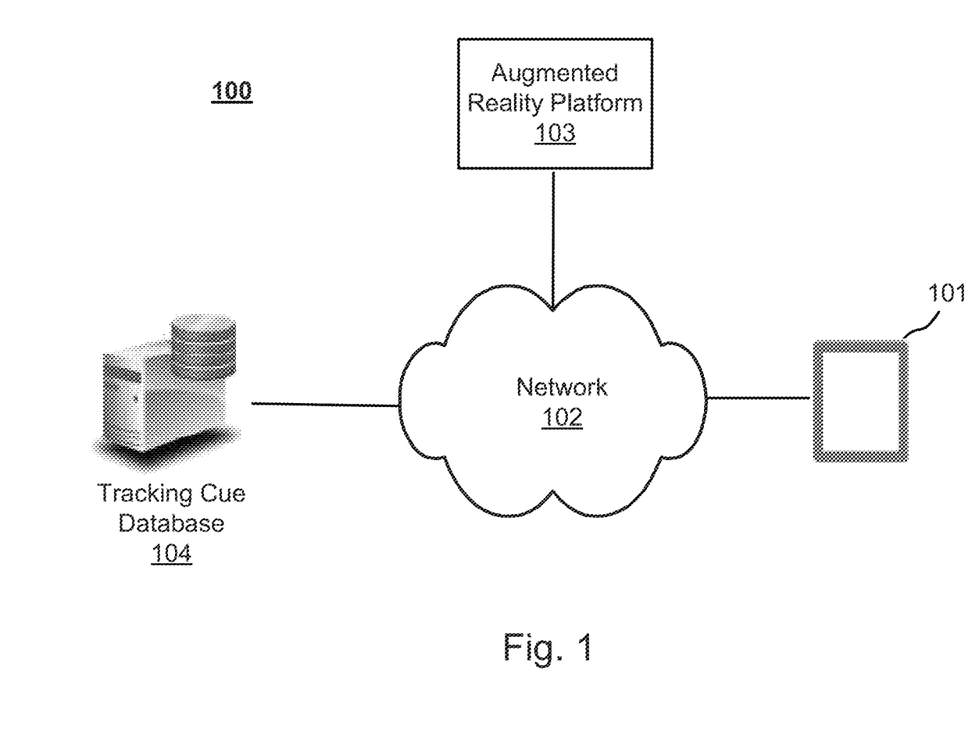
FIG. 1 depicts a block diagram of a system architecture for gathering data and sending data through a network, according to an exemplary embodiment.

Referring to FIG. 1, a schematic diagram of a system 100 for gathering data from various sources or devices is shown, according to an exemplary embodiment. As illustrated, network 102 may be communicatively coupled with a mobile device 101, an augmented reality platform 103, and a tracking cue database 104. Mobile device 101 may provide a view of augmented reality for a user, and may be responsible for gathering data for identification of sub-space IDs and tracking cues. Augmented reality platform 103 may be responsible for running computer vision algorithms to determine the pose of mobile device 101. Tracking cue database 104 may store all tracking cues for a collection of sub-spaces (e.g., rooms within a building), and may be indexed by sub-space ID such that particular segments of the tracking cue database correspond to the particular tracking cues in the individual sub-spaces.

It should be appreciated that the system 100 of FIG. 1 may be implemented in a variety of ways. Architecture within system 100 may be implemented as a hardware component (e.g., as a module) within a network element or network box. It should also be appreciated that architecture within system 100 may be implemented in computer executable software (e.g., on a tangible computer-readable medium). The elements of system 100 may be located on a single device or distributed across a plurality of devices including one or more centralized servers and one or more mobile devices or end user devices.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, network 102 may support an Internet network, a wireless communication network, cellular networks, Bluetooth, or the like, or any combination thereof. Although network 102 is depicted as one network, it should be appreciated that network 102 may comprise a plurality of interconnected networks, such as, for example the Internet, a cellular network, corporate networks, government networks, or home networks.

Mobile device 101 may be any mobile computing solution that is used by a user to facilitate interoperability with the augmented reality platform and the tracking cue database. The mobile device 101 is equipped to provide one or more see-through images imposed upon a real-world view, i.e., an augmented reality experience. Mobile device 101 may be, for example, a tablet computer, a smartphone, or a wearable display device. A wearable display device may be a display device that a person wears on the head in order to have video information directly displayed in front of their eyes. For the sake of brevity, such a wearable device may be referred to as a head-mounted display device or HMD. U.S. Pat. No. 8,212,859 to Tang et al. ("Tang") further describes the construction and function of HMDs. The disclosure of Tang is incorporated herein by reference. According to Tang, an HMD may have one or two small CRT, LCD, or OLED displays with magnifying lenses and other associated optical elements. The displays and optics are typically embedded in a helmet, glasses, goggles, contacts, or a visor which a user can wear.

According to exemplary embodiments of the present invention, mobile device 101 may include the following features: a processor, a display (such as a screen or a touchscreen), a vision sensor (such as a camera), a microphone, an accelerometer, one or more speakers, wireless communications capabilities, one or more local positioning receivers, image and object recognition processors, an audio tone recognition processor, a GPS chip, a Wi-Fi chip, RFID sensor, and/or light detectors. Mobile device 101 may be assigned one or more unique identifiers and may be equipped or configured to provide an augmented reality display to a user.

Augmented reality platform 103 may comprise a computer server for providing an augmented reality experience for a user. Augmented reality platform 103 may comprise a processor and computer executable software (e.g., on a tangible computer-readable medium) for running computer vision algorithms to determine the pose of mobile device 101. Augmented reality platform 103 may perform various processing functions, including feature extraction to extract lines, edges, ridges, or other localized interest points from an image; detection or segmentation to select a specific set of interest points within an image or segment multiple image regions that contain a specific object of interest; image recognition to categorize a detected object into a particular category; noise reduction; contrast enhancement; and/or space scaling, for example. The amount of processing that augmented reality platform 103 carries out is immense, and features of the present invention enhance the efficiency of this processing by reducing the amount of tracking cues and images that need to be processed to determine the pose of mobile device 101.

Tracking cue database 104 may comprise a database for storing all tracking cues for a large space. Tracking cues may include object data or signal data for known objects or signals in the large space, for example. The objects may include codes, maps, images, or any physical object within the large space, including loose items and structural components. The signals may include electromagnetic waves, RFID signals, radio signals, audio signals, or Wi-Fi signals, for example. The data associated with each object or signal may be stored in the tracking cue database 104 and used to assist the augmented reality platform 103 in determining pose of mobile device 101. The large space may comprise a collection of sub-spaces (e.g., rooms within a building), and tracking cue data for objects in each of the sub-spaces may be known and stored in tracking cue database 104. The tracking cue database 104 may be indexed by sub-space ID such that particular segments of the tracking cue database, corresponding to the particular tracking cues (i.e., data for the known objects) in the individual sub-spaces, may be quickly retrieved and processed.

Figure 2:
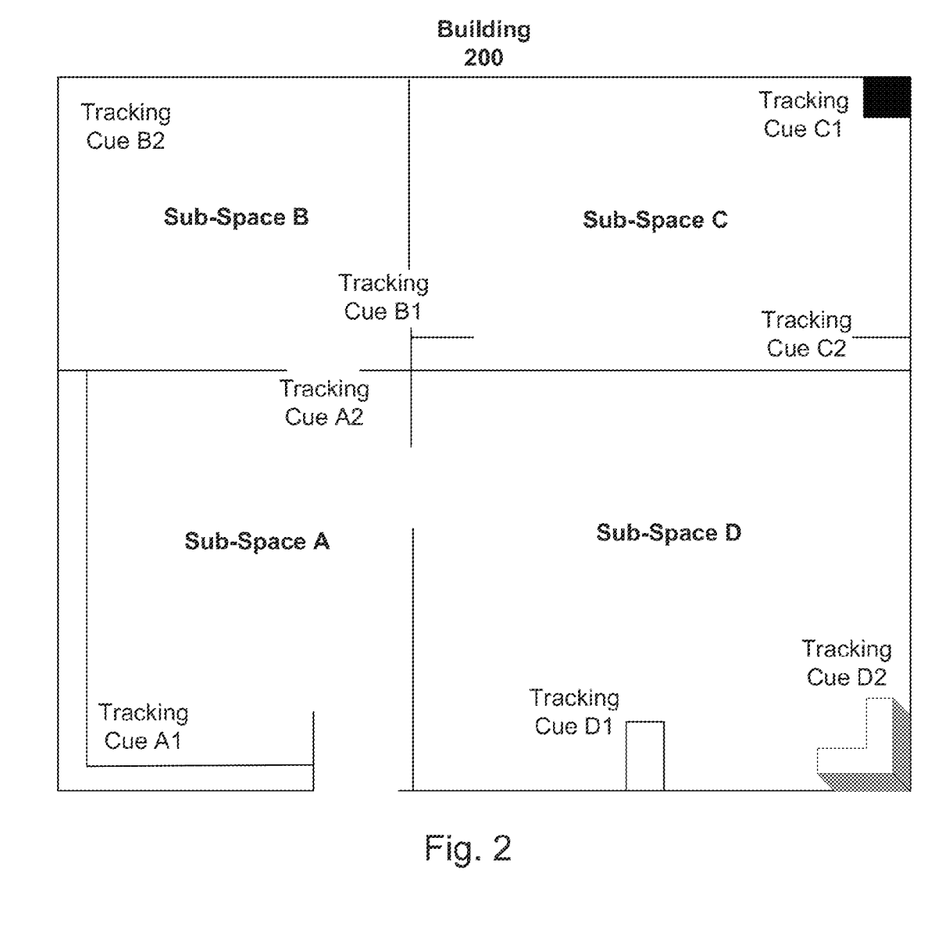
FIG. 2 depicts an exemplary large space divided into smaller sub-spaces, according to an exemplary embodiment.

FIG. 2 shows an exemplary large space divided into several sub-spaces. Each sub-space may be assigned a sub-space ID. In FIG. 2, building 200 is divided into four sub-spaces and each sub-space has a unique ID: sub-space A, sub-space B, sub-space C, and sub-space D. Within each sub-space are one or more known objects or features, referred to as tracking cues that may be captured by sensors on mobile device 101 and used to help establish the pose of mobile device 101 by the augmented reality platform 103. Each of the tracking cues in a sub-space may be assigned to the sub-space ID for the particular sub-space in tracking cue database 104. The tracking cue database 104 may be located remotely along with the augmented reality platform 103, and may be configured to transmit and receive information to and from mobile device 101. The tracking cue database 104 and augmented reality platform 103 may be wirelessly connected to mobile device 101.

As explained further below, mobile device 101 may capture data and/or output data for the purpose of determining its location within the large space, i.e., determining in which particular sub-space mobile device 101 is located. In other words, data captured by mobile device 101 is used to determine the sub-space ID of the sub-space in which mobile device 101 is located. Once the sub-space ID is determined, the visual tracking cues stored in tracking cue database 104, and which have been previously assigned to that particular sub-space ID, are identified and sent to the augmented reality platform 103 for the purpose of executing vision-based algorithms. Alternatively, the subset of visual tracking cues may be sent to mobile device 101. In this manner, the tracking cues within the tracking cue database 104 are disambiguated based on sub-space ID and all extraneous tracking cues are disregarded. The augmented reality platform 103 may then execute the vision-based algorithms to efficiently establish the "narrow pose," which refers to the pose of the mobile device 101 within the sub-space, and which narrow pose is used to provide an augmented reality experience to a user. The vision-based pose algorithms may include simultaneous localization and mapping (SLAM), parallel tracking and mapping (PTAM), and dense tracking and mapping, for example. Because each sub-space ID corresponds to a specific physical sub-space within the large space, the augmented reality platform 103 executing the algorithms will only receive or reference tracking cues that correspond to the physical sub-space where the mobile device 101 is currently located.

Figure 3:
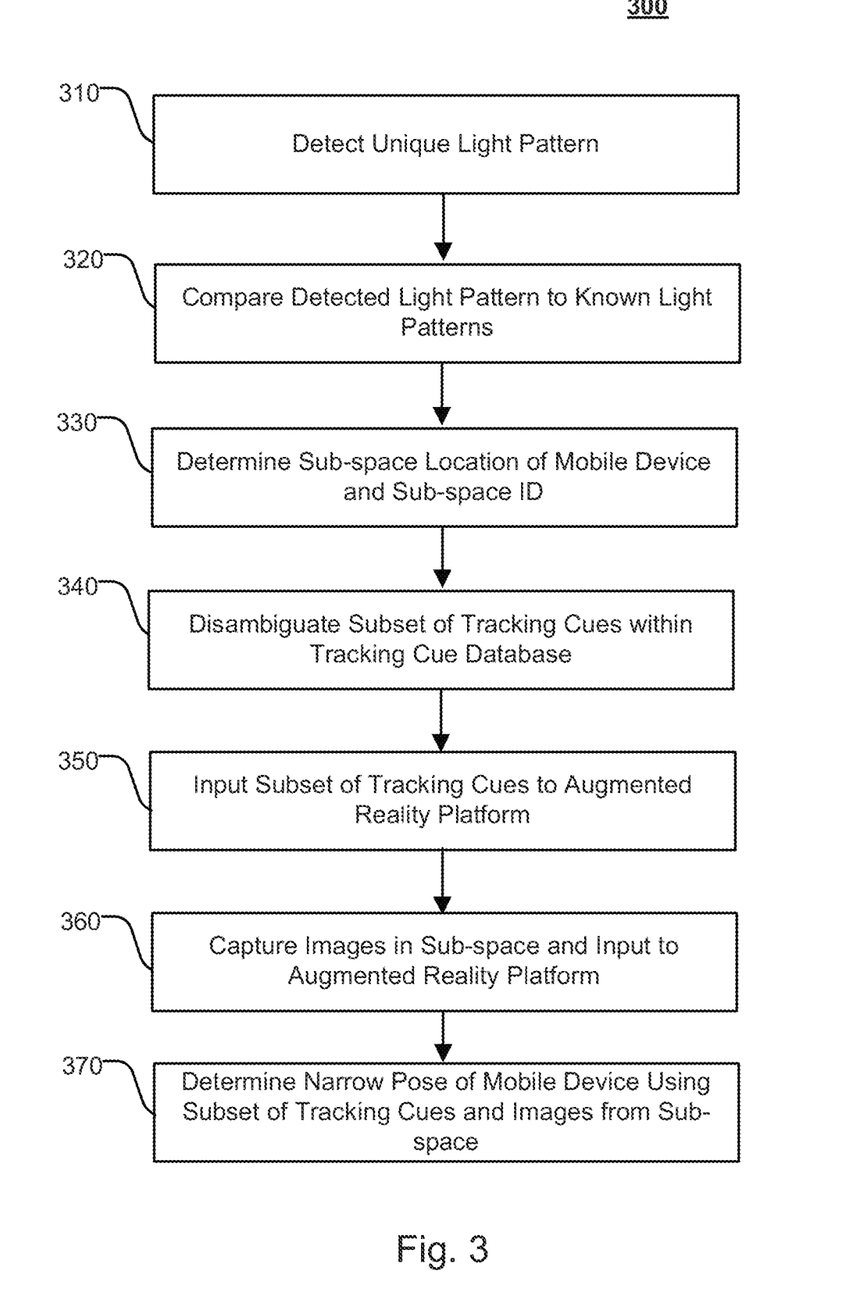
FIG. 3 depicts an illustrative flowchart of a method for disambiguating an augmented reality tracking cue database, according to an embodiment of the invention.
Figure 4:
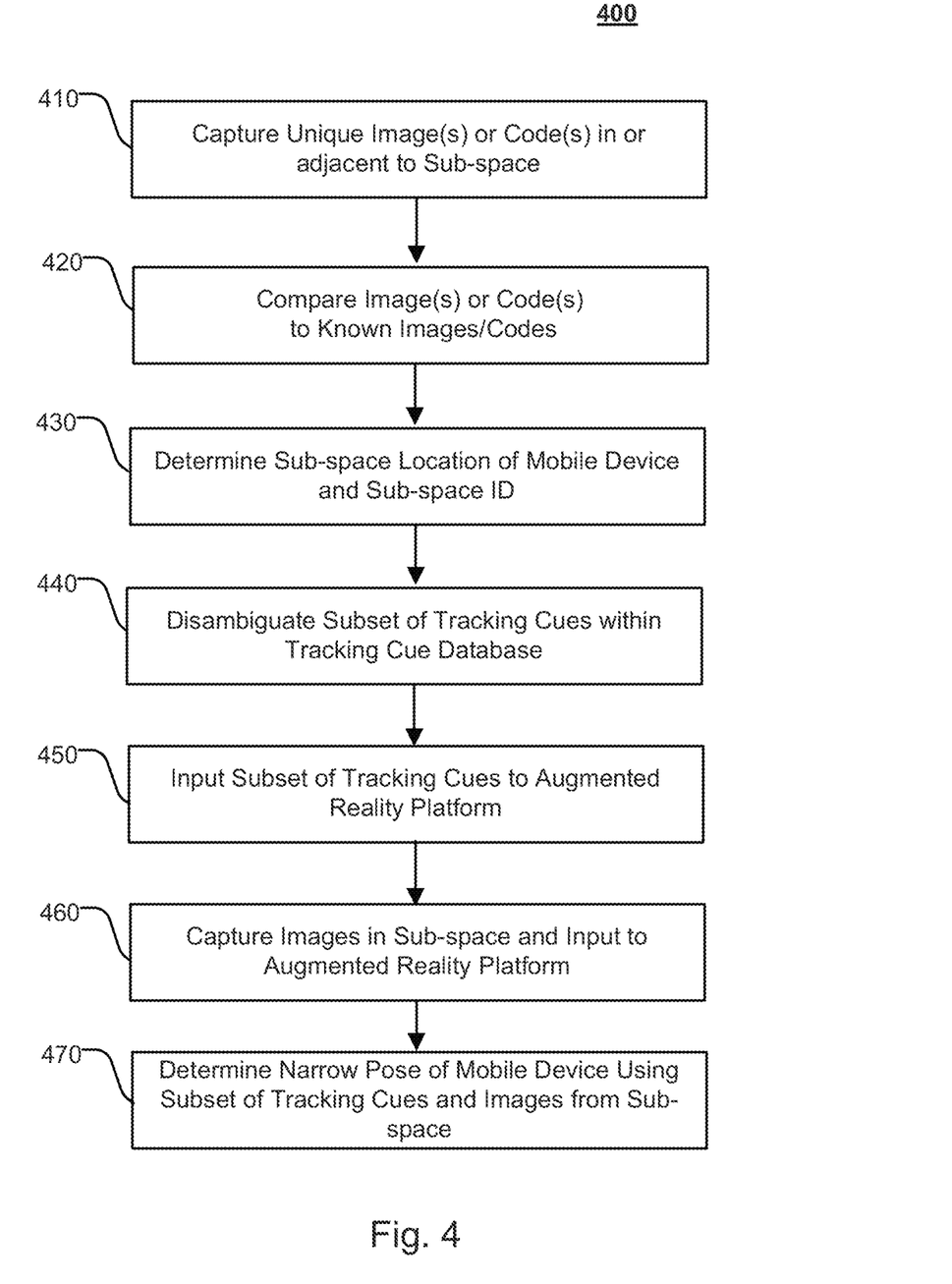
FIG. 4 depicts another illustrative flowchart of a method for disambiguating an augmented reality tracking cue database, according to an embodiment of the invention.

Referring to FIGS. 3-4, illustrative flowcharts of methods for determining a sub-space ID is shown. These exemplary methods 300, 400 are provided by way of example, as there are a variety of ways to carry out methods according to the present disclosure. The methods 300, 400 shown in FIGS. 3-4 can be executed or otherwise performed by one or a combination of various systems and modules. The methods 300, 400 described below may be carried out by system 100 shown in FIG. 1, by way of example, and various elements of the system 100 are referenced in explaining the exemplary methods of FIGS. 3-4. Each block shown in FIGS. 3-4 represents one or more processes, decisions, methods or subroutines carried out in exemplary methods 300 or 400, and these processes, decisions, methods or subroutines are not necessarily carried out in the specific order outlined in FIGS. 3-4, nor are each of them required.

FIG. 3 depicts an exemplary method for determining the sub-space ID using light pulses. U.S. Pat. No. 8,248,467 discloses a method for establishing local indoor positioning using light, the disclosure of which is incorporated herein by reference. Within a physical sub-space, one or more light sources may be strategically placed at various points in the sub-space. Each of the light sources may be configured to flicker with a unique digital pulse. The mobile interface device may be equipped to detect the light pulses in the sub-space.

Referring to FIG. 3, exemplary method 300 may begin at block 310. At 310, mobile device 101 may detect and capture information about a unique light pattern or pulse within a particular sub-space (e.g., sub-space A in FIG. 2). Pulses from a number of light sources may be used to identify the mobile device's partial position (i.e., location within a large space). Importantly, each sub-space may have its own unique light pattern or pulse. Partial position may be the mobile device's position in the (x, y) plane of the larger space (e.g., building 200). Partial positions are associated with a sub-space (representing a range of location coordinates) within the larger space, and accordingly, with a sub-space ID in the tracking cue database 104.

At 320, information about the light pattern detected and captured by mobile device 101 may be compared to known light patterns indexed by sub-space. Known light patterns may be stored in tracking cue database 104, for example. Mobile device 101 itself may determine the partial position, or the mobile device 101 may transmit the received light pulse signals to one or more servers, e.g., the augmented reality platform 103, communicatively coupled with tracking cue database 104.

At 330, the sub-space location of mobile device 101 may be determined by the comparison of the detected light patterns to the known light patterns. The augmented reality platform 103 may determine the sub-space location, or partial position, of mobile device 101, and accordingly determine the sub-space ID associated with that particular sub-space location. Alternatively, mobile device 101 may determine its partial position by comparing the detected light pulse to known light pulses (stored and indexed in, for example, tracking cue database 104), and accordingly determine the sub-space ID associated with the sub-space in which mobile device 101 finds itself.

Information may be provided to a mobile interface device by a local positioning system that facilitates the establishment or estimation of the position and orientation of a mobile interface device within a coordinate system described or approximated by a three dimensional model of a structure in which the mobile device is disposed. The system 100 may use information from more than one local positioning system. Alternatively or in addition, the system 100 may use information from a global positioning system (GPS).

Once the sub-space ID is determined, at 340 all of the tracking cues that are assigned to that sub-space ID may be disambiguated from within tracking cue database 104. In this manner, only a very small portion of the tracking cue database need be retrieved and later processed while mobile device 101 remains in that particular sub-space.

At 350, the subset of tracking cues may be transmitted to, or retrieved by, the augmented reality platform 103 and ultimately input into one or more computer vision algorithms. Other tracking cues corresponding to other sub-spaces of the large space may be disregarded.

At 360, mobile device 101 may also capture one or more images in the sub-space using a camera, and the captured images may be transmitted to the augmented reality platform 103 and ultimately input into the one or more computer vision algorithms, along with the subset of tracking cues.

At 370, the disambiguated (or subset of) tracking cues (based on the sub-space ID) and the received images may then be used by augmented reality platform 103 to estimate or determine the narrow pose of mobile device 101.

In other embodiments, the mobile device's partial position (or sub-space location) may be determined based on received electromagnetic waves, such as unique RFID signals, radio signals, unique audio signals, or unique Wi-Fi signals, for example.

In this manner, the amount of processing that augmented reality platform 103 needs to perform is reduced, and features of the present invention enhance the efficiency of this processing by reducing the amount of tracking cues and images that need to be processed to determine the narrow pose of mobile device 101.

FIG. 4 depicts an exemplary method for determining the sub-space ID using unique images in the sub-space. Each sub-space ID in the tracking cue database may have been associated with one or more unique images or a single unique image. In the embodiment shown in FIG. 4, the unique images may include recognizable visual features in or adjacent to the sub-space (e.g., on an entry-way or door to the sub-space). These unique recognizable features may include physical items in the sub-space, QR codes, bar codes, colors of the sub-space, or a map or point cloud representing the physical shape of the sub-space, for example. A point cloud is a known set of data points within a space or coordinate system and may include, for example, 3D laser or infrared scans and/or 3D CAD models of an area or an object.

Exemplary method 400 may begin at block 410. At 410, mobile device 101 may capture information about a unique characteristic of a particular sub-space, such as a unique image at the sub-space (e.g., sub-space C in FIG. 2). The unique image may be a bar code, for example, on or near an entry-way of sub-space C. Alternatively, a unique code corresponding to sub-space C may be input by the user into mobile device 101.

At 420, the captured information about a unique characteristic, such as image(s) or code(s), may be compared to known unique characteristics, such as images or codes, indexed by sub-space. Known unique characteristics, such as images or codes, may be stored in tracking cue database 104, for example. Mobile device 101, itself, may determine the partial position, or the mobile device 101 may transmit the captured information about unique image(s)/code(s) to one or more servers, e.g., the augmented reality platform 103, communicatively coupled with tracking cue database 104.

At 430, the sub-space location of mobile device 101 may be determined by the comparison of the captured information about unique image(s)/code(s) to the known images. The augmented reality platform 103 may determine the sub-space location, or partial position, of mobile device 101, and accordingly determine the sub-space ID associated with that particular sub-space location. Alternatively, mobile device 101 may determine its partial position by comparing the captured unique image(s)/code(s) to known images/codes (stored and indexed in, for example, tracking cue database 104), and accordingly determine the sub-space ID associated with the sub-space in which mobile device 101 finds itself.

Once the sub-space ID is determined, at 440 all of the tracking cues that are assigned to that sub-space ID may be disambiguated from within tracking cue database 104. In this manner, only a very small portion of the tracking cue database need be retrieved and later processed by the augmented reality platform 103 while mobile device 101 remains in that particular sub-space and continues to transmit images of the sub-space to the augmented reality platform 103.

At 450, the subset of tracking cues may be transmitted to, or retrieved by, the augmented reality platform 103 and ultimately input into one or more computer vision algorithms. Other tracking cues corresponding to other sub-spaces of the large space may be disregarded.

At 460, mobile device 101 may capture additional images in the sub-space using a camera, and the captured images may be transmitted to the augmented reality platform 103 and ultimately input into the one or more computer vision algorithms, along with the subset of tracking cues.

At 470, the disambiguated (or subset of) tracking cues (based on the sub-space ID) and the received images may then be used by augmented reality platform 103 to estimate or determine the narrow pose of mobile device 101.

In this additional manner, the amount of processing that augmented reality platform 103 needs to perform is reduced, and features of the present invention enhance the efficiency of this processing by reducing the amount of tracking cues and images that need to be processed to determine the narrow pose of mobile device 101.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. A method for determining a narrow pose of a mobile device in a sub-space of a large space for providing an augmented reality experience, the method comprising:
   receiving, by the mobile device from a local positioning system at least partially disposed within the subspace, local position information relative to a coordinate system associated with a three dimensional model of the sub-space;
   receiving, by a central processor, information from the mobile device before a sub-space location of the mobile device within the large space is known, the information including the local position information and being usable to determine a sub-space ID uniquely corresponding to the sub-space in which the mobile device is disposed;

using the information to determine the sub-space ID corresponding to the sub-space in which the mobile device is disposed;

determining a sub-space location of the mobile device within the large space using the unique sub-space ID;

identifying, using the sub-space ID, a subset of tracking cues within a tracking cue database indexed by sub-space IDs uniquely corresponding to sub-spaces within the large space, the subset of tracking cues comprising tracking cues within the sub-space in which the mobile device is disposed;

processing the subset of tracking cues by an augmented reality processor;

receiving images of the sub-space captured by the mobile device;

processing the images by the augmented reality processor; and determining, by the augmented reality processor, the narrow pose of the mobile device in the sub-space, using the inputted images and subset of tracking cues.

2. The method of claim 1, wherein the local position information is received by the mobile device as a digital signal comprising at least one of the set consisting of a light pulse, an RFID signal, a radio signal, an audio signal, and a Wi-Fi signal.

3. The method of claim 1, wherein the local position information is received by the mobile device as a unique audio signal sounded within the sub-space.

4. The method of claim 1, wherein the mobile device is a head-mounted display, a tablet computer, or a smartphone.

5. The method of claim 4, wherein the local position information is received by the mobile device using a camera on the mobile device.

6. The method of claim 1, wherein all known tracking cues of the large space are stored in the tracking cue database.

7. The method of claim 1, wherein the large space is a building and the sub-space is a room in the building.

8. The method of claim 1, wherein the large space is a ship and the sub-space is a room in the ship.

9. A non-transitory computer-readable medium comprising instructions which when executed cause a processor to perform the actions of:

receiving from the mobile device before a sub-space location of the mobile device within the large space is known, information usable to determine a sub-space ID uniquely corresponding to the sub-space in which the mobile device is disposed, the information including local position information relative to a coordinate system associated with a three dimensional model of the sub-space in which the mobile device is disposed;

using the information to determine the sub-space ID corresponding to the sub-space in which the mobile device is disposed;

determining a sub-space location of the mobile device within the large space using the unique sub-space ID;

identifying a subset of tracking cues within a tracking cue database by using the sub-space ID, the tracking cue database being indexed by sub-space IDs uniquely corresponding to sub-spaces within the large space and the subset of tracking cues comprising tracking cues within the sub-space in which the mobile device is disposed;

processing the subset of tracking cues by an augmented reality processor;

receiving images of the sub-space captured by the mobile device;

processing the images by the augmented reality processor; and determining, by the augmented reality processor, the narrow pose of the mobile device in the sub-space, using the inputted images and subset of tracking cues.

* * * * *